(12) United States Patent
Fryback et al.

(10) Patent No.: US 12,058,181 B2
(45) Date of Patent: *Aug. 6, 2024

(54) SYSTEMS AND METHODS FOR DYNAMIC DMARC ENFORCEMENT

(71) Applicant: Proofpoint, Inc., Sunnyvale, CA (US)

(72) Inventors: Alexander Scott Fryback, Denver, CO (US); Robert Michael Fleming, Jr., Clinton Township, MI (US)

(73) Assignee: PROOFPOINT, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,749

(22) Filed: Jul. 6, 2022

(65) Prior Publication Data

US 2022/0353302 A1 Nov. 3, 2022

Related U.S. Application Data

(63) Continuation of application No. 16/834,747, filed on Mar. 30, 2020, now Pat. No. 11,388,201.

(60) Provisional application No. 62/938,152, filed on Nov. 20, 2019.

(51) Int. Cl.
*H04L 9/40* (2022.01)
*H04L 51/212* (2022.01)

(52) U.S. Cl.
CPC .......... *H04L 63/205* (2013.01); *H04L 51/212* (2022.05)

(58) Field of Classification Search
CPC .................................................. H04L 63/205
See application file for complete search history.

(56) References Cited

U.S. PATENT DOCUMENTS

| | | | |
|---|---|---|---|
| 9,847,973 B1* | 12/2017 | Jakobsson | H04L 63/1433 |
| 11,063,986 B2* | 7/2021 | Coleman | H04L 9/3247 |
| 2018/0375877 A1* | 12/2018 | Jakobsson | G06F 16/955 |
| 2019/0075121 A1* | 3/2019 | Dutta | H04L 63/102 |
| 2019/0222608 A1* | 7/2019 | Naccarato | H04L 51/212 |
| 2019/0362315 A1* | 11/2019 | Rachal | H04L 63/1483 |
| 2021/0240836 A1* | 8/2021 | Hazony | G09B 5/00 |

* cited by examiner

*Primary Examiner* — Esther B. Henderson
(74) *Attorney, Agent, or Firm* — Sprinkle IP Law Group

(57) ABSTRACT

A dynamic Domain-based Message Authentication, Reporting, and Conformance (DMARC) enforcement solution is disclosed. A mail transfer agent (MTA) receives an email and obtains an originating email domain from the email. The MTA queries a dynamic DMARC module (which can be implemented on a domain name system (DNS) infrastructure or the MTA) about any local policy override associated with the originating email domain. DMARC policy overrides can be published from a source system and stored locally to the dynamic DMARC module (e.g., on the DNS infrastructure or the MTA). The MTA receives a response which contains the local policy override published from the source system and dynamically overrides the fact that the email had failed DMARC. In this way, an email which failed DMARC can still be dynamically considered and delivered if a local policy override that is published from a source system indicates that it should be delivered.

20 Claims, 5 Drawing Sheets

SYSTEMS AND METHODS FOR DYNAMIC DMARC ENFORCEMENT

CROSS-REFERENCE TO RELATED APPLICATION(S)

This application is a continuation of, and claims a benefit of priority under 35 U.S.C. § 120 from, U.S. patent application Ser. No. 16/834,747, filed Mar. 30, 2020, issued as U.S. Pat. No. 11,388,201, entitled "SYSTEMS AND METHODS FOR DYNAMIC DMARC ENFORCEMENT," which claims a benefit of priority under 35 U.S.C. § 119(e) from Provisional Application No. 62/938,152, filed Nov. 20, 2019, entitled "SYSTEMS AND METHODS FOR DYNAMIC DMARC ENFORCEMENT." The entire contents of applications listed in this paragraph are incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to network security and domain protection. More particularly, this invention relates to systems, methods, and computer program products for domain-based message processing and protection.

BACKGROUND OF THE RELATED ART

The current communication protocols for electronic mail transmission, such as the Simple Mail Transfer Protocol (SMTP), do not restrict the use of domains in the RFC 2821 (MFROM) and RFC 2822 (Header From) email address when composing an email. (RFC refers to "proposed for comments" documentation for a proposed standard relating to the SMTP.) This allows bad actors such as cyber criminals to impersonate valid domains belonging to an entity and/or a brand.

To this end, Domain-based Message Authentication, Reporting, and Conformance (DMARC) works with Sender Policy Framework (SPF) and Domain Keys Identified Mail (DKIM) to authenticate mail senders and DMARC helps receiving mail systems determine what to do with messages sent from a customer domain that fail SPF or DKIM checks. Unfortunately, legitimate messages from trusted domains may also fail these checks. As a result, even legitimate messages could be blocked from reaching their respective destinations. This leads to an undesirable level of efficacy where only a fraction (e.g., about 10 percent) of domains with DMARC protection actually utilizes DMARC. Although some existing DMARC solutions offer exception handling for overriding DMARC policies and allowing safelisted messages to proceed, management of such DMARC exceptions is tedious, cumbersome, and inefficient.

In view of the foregoing, there is a need for a new DMARC solution. Embodiments disclosed herein can address this need and more.

SUMMARY OF THE DISCLOSURE

By externally managing local policy overrides in a Domain Name System (DNS) structure or infrastructure, embodiments of a new DMARC solution disclosed herein can automatically deploy, for instance, from an email authentication management (EAM) portal, local policy overrides for DMARC. In this way, regardless of DMARC policies, the EAM system can ensure that a legitimate electronic mail (email) message from a trusted source that failed DMARC gets delivered, while an email message from an untrusted source that failed DMARC gets blocked.

Embodiments of the EAM system disclosed herein further include a dynamic DMARC middleware or module that can be implemented on the DNS infrastructure or on a DMARC-compliant message transfer agent (MTA). The MTA is configured for receiving an email message and processing the email message to obtain information such as an originating email domain. In some embodiments, the MTA can query the DNS infrastructure (which implements the dynamic DMARC middleware or module) about the originating email domain's DMARC policy and, in some cases, query the DNS infrastructure about what trusted source is authorized to send email messages on behalf of the originating email domain. In some embodiments, the DNS infrastructure, through the dynamic DMARC middleware or module thus implemented, can determine whether any local policy overrides apply to the originating email domain and return the local policy override(s) to the MTA. In some embodiments, the MTA can understand/consume the local policy override(s) provided by the DNS infrastructure and dynamically enforce DMARC (e.g., deliver, modify, quarantine, reject) such that, regardless of the originating email domain's existing DMARC policy (and even if the originating email domain has no DMARC policy), if the email message is from a trusted source, the email message will be delivered even if it fails DMARC (or if the originating email domain has no DMARC policy) and, if the email message fails DMARC (or if the originating email domain has no DMARC policy) and is from an untrusted source, the email message will be blocked. In some embodiments, such a local policy override can be published (e.g., via an application programming interface (API)) to the DNS infrastructure from a data source such as a client device of the EAM system or a DMARC reporting and consolidation service.

In some embodiments, a user interface of the EAM system or the DMARC reporting and consolidation service can include tools for creating, modifying, and/or managing DMARC local policy overrides (e.g., criteria such as sending Internet Protocol (IP) address, sending hostname, SPF results, DKIM results, DMARC results, etc.). The creation, modification, management, and storage of DMARC local policy overrides can be all external to the MTA. In some embodiments, DMARC local policy overrides can be published to and stored on the MTA. In some embodiments, the MTA, the DNS infrastructure, and the data source operate independently of one another.

One embodiment comprises a system comprising a processor and a non-transitory computer-readable storage medium that stores computer instructions translatable by the processor to perform a method substantially as described herein for dynamic DMARC enforcement. Another embodiment comprises a computer program product having a non-transitory computer-readable storage medium that stores computer instructions translatable by a processor to perform a method substantially as described herein. Numerous other embodiments are also possible.

These, and other aspects of the disclosure, will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
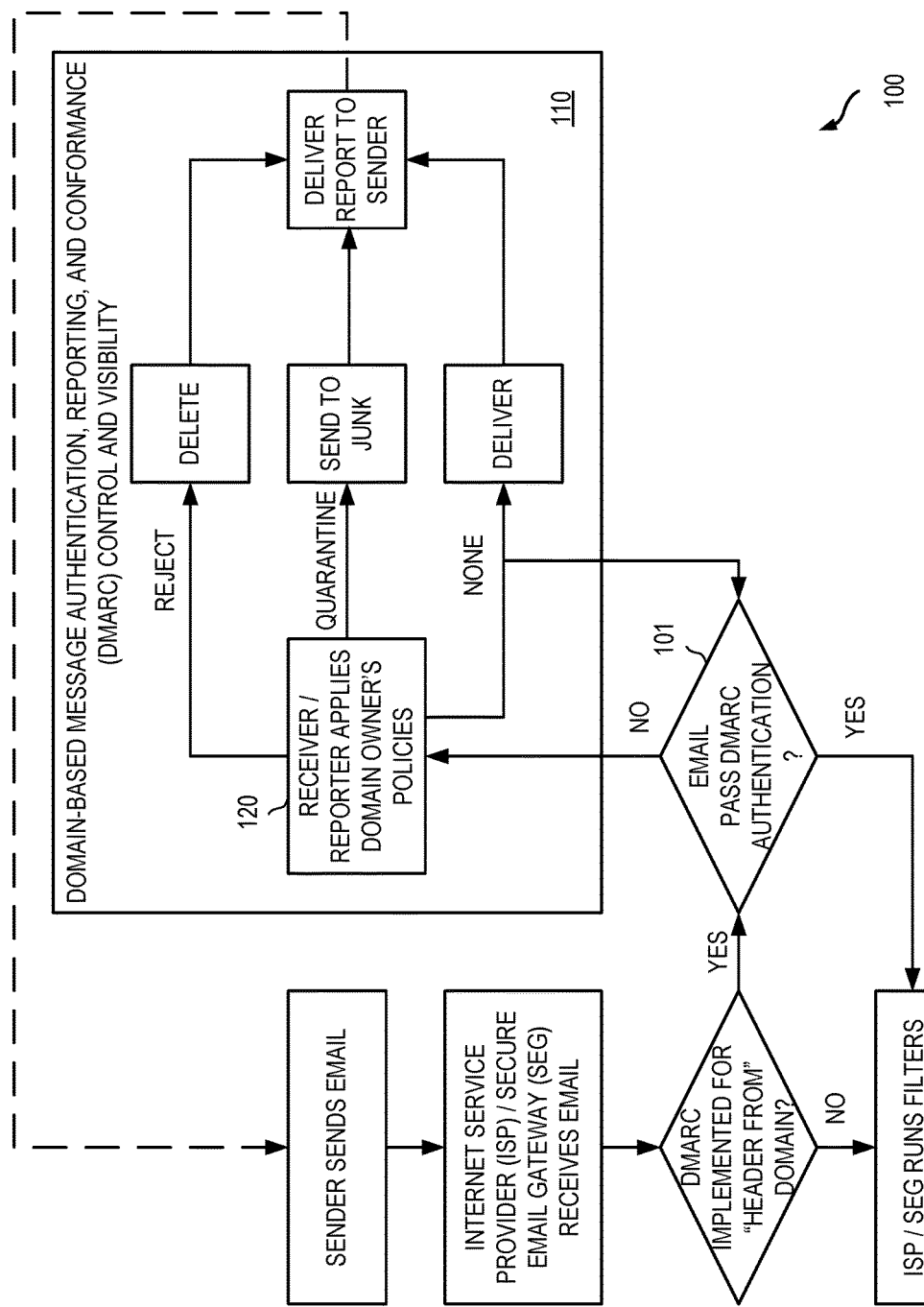
FIG. 1 depicts a diagrammatic representation of a networking computing environment illustrating the DMARC protocol.

As illustrated in FIG. 1, the DMARC protocol requires two parties for it to work—an email sender and an email receiver in a distributed network computing environment 100. If an email message fails authentication (e.g., via SPF/DKIM processing), it will be blocked. As discussed above, DMARC 110 can help the email receiver 120 determine what to do with an email message that fails an SPF or DKIM check (101).

In this case, the email receiver respects and enforces DMARC policies on behalf of a domain owner. When the email receiver receives an email message, it applies the domain owner's DMARC policies.

In the example of FIG. 1, the DMARC policy settings can include "Reject," "Quarantine," and "None." With the "Reject" setting, email messages that fail a DMARC policy do not get delivered at all. With the "Quarantine" setting, email messages that fail a DMARC policy can be moved to a quarantine location. With the "None" setting, the entire email authentication ecosystem is monitored but no specific action is taken on email messages that fail a DMARC check. With the "p=none" setting, DMARC results are only reported, but do not affect delivery of a message. If there is no DMARC policy, the message will be treated the same as a p=none setting, but the authentication results are not reported at all.

As alluded to above, because legitimate messages (e.g., messages from trusted domains) can still fail these checks and can be blocked from reaching their respective destinations, only a fraction (e.g., about 10 percent) of domains with DMARC protection actually utilize the DMARC protocol. Although some existing DMARC solutions offer exception handling for overriding DMARC policies and allowing safelisted messages to proceed, management of such DMARC exceptions is tedious, cumbersome, and inefficient. One reason is that, although an MTA can be flexible in its configuration, managing exceptions on the MTA, at scale, is very difficult.

By externally managing "local policy overrides" in a Domain Name System (DNS) infrastructure, embodiments of a new DMARC solution disclosed herein can automatically deploy, from an EAM system, local policy overrides for DMARC. "Local policy overrides" is a term specific to the DMARC protocol. With "local policy overrides," receivers of email messages can ultimately make their own decisions about the final disposition of an email message.

These overrides can be determined manually or automatically. For instance, using data modeling, the invention can automatically and programmatically determine overrides to be considered and ultimately published. Technically, the data model may run completely outside of the DNS infrastructure or the MTA infrastructure and may be hosted in a third infrastructure such as a cloud, where it runs and ultimately determines overrides. The overrides are published to the DNS infrastructure and then be queried by the receiving MTA. Whether the overrides are determined manually or automatically, they are published and utilized by embodiments disclosed herein the same way.

In this way, regardless of DMARC policies (and even if there is none), the invention can ensure that a legitimate email message from a trusted source failing DMARC gets delivered, while an email message from an untrusted source failing DMARC gets blocked. Unlike previous DMARC solutions, the DMARC policies can now be enforced dynamically and, in turn, improve the efficacy of DMARC systems.

Figure 2A:
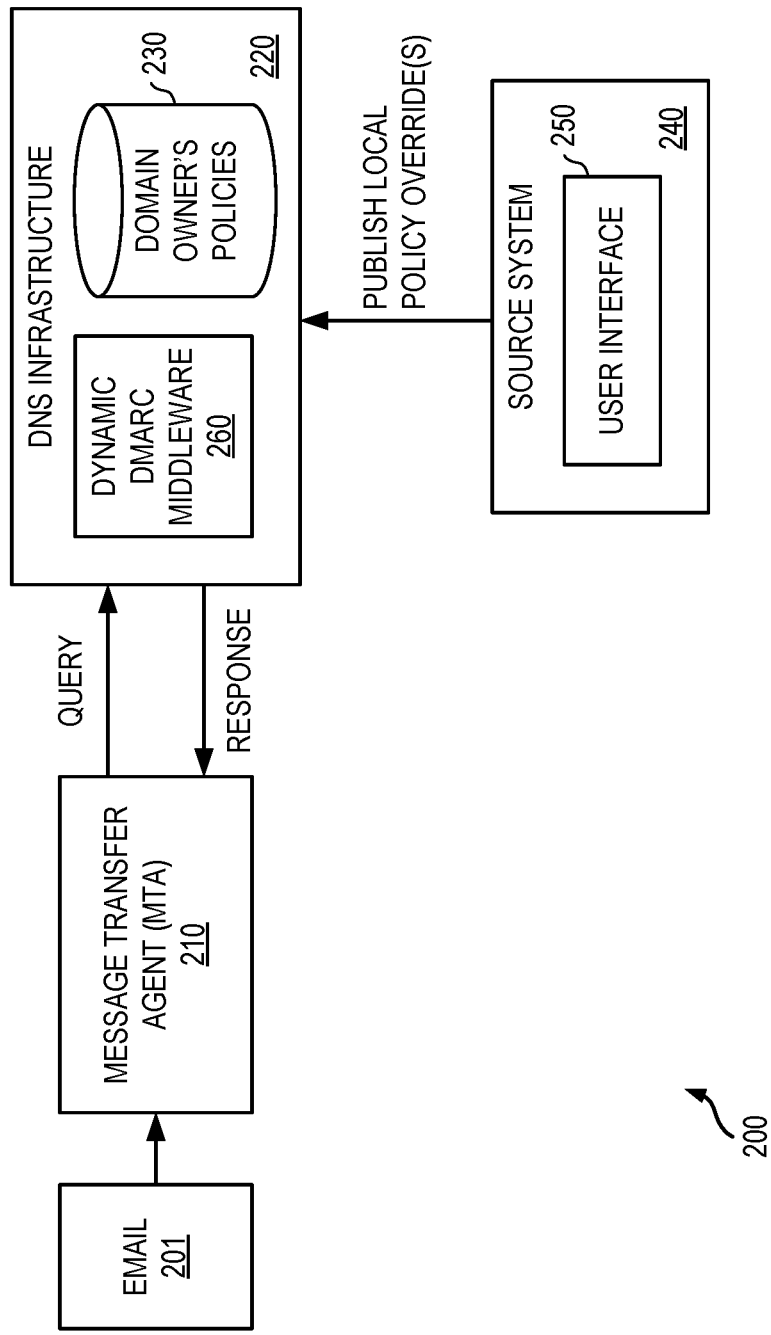
FIGS. 2A-2B respectively depicts a diagrammatic representation of a dynamic DMARC enforcement system according to some embodiments disclosed herein.

FIG. 2A depicts a diagrammatic representation of a dynamic DMARC enforcement system 200 according to some embodiments disclosed herein. In the example of FIG. 2A, dynamic DMARC middleware or module 260 resides on a DNS infrastructure 220 and is communicatively connected to MTA 210. MTA 210 can implement a DMARC-compliant MTA. MTA 210 may reside at an SEG or any appropriate mail processing server machine.

In this case, MTA 210 is configured for receiving an email message 201 and processing email message 201 to obtain information such as an originating email domain (e.g., a sender domain extracted from MFROM or the header of the email message). Note that the actual data field from which this information is obtained may vary from implementation to implementation, depending upon the authentication protocol involved (e.g., DMARC, SPF, DKIM, etc.). Additionally, as illustrated in FIG. 2A, MTA 210 is adapted to query DNS infrastructure 220 (that implements dynamic DMARC middleware or module) about the originating email domain's DMARC policy and what trusted source is authorized to send email messages on behalf of the originating email domain.

In some embodiments, dynamic DMARC middleware or module 260 residing on DNS infrastructure 220 is configured for determining whether any "local policy overrides" (e.g., a domain owner's policy stored in a policy store 230) apply to the originating email domain's DMARC policy (if any) and return the result to MTA 210. Based on the query response from DNS infrastructure 220, MTA 210 then takes appropriate action.

In some embodiments, MTA 210 is configured for consuming any local policy override provided by DNS infrastructure 220 and dynamically enforcing DMARC policy settings (i.e., taking appropriate action such as deliver, modify, quarantine, reject, etc.). In this way, regardless of the originating email domain's existing DMARC policy, a decision is dynamically made so that if email message 201 is from a trusted source, email message 201 will be delivered even if it fails DMARC. However, if email message 201 that fails DMARC is from an untrusted source, then email message 201 will be blocked.

In embodiments disclosed herein, a local policy override can be published (e.g., via an API) to DNS infrastructure 220 from a source system 240 such as a client device or a DMARC reporting and consolidation service. A user interface 250 or the DMARC reporting and consolidation service can include tools for creating, modifying, and/or managing DMARC local policy overrides (e.g., criteria such as sending IP address, sending hostname, SPF results, DKIM results, DMARC results, etc.). In some cases, the criteria for the DMARC local policy overrides can include the RFC 2821 envelope sender/MFROM and/or RFC 2822 Header From domains. As illustrated in FIG. 2A, the creation, modification, management, and storage of DMARC local policy overrides are all external and/or remote to MTA 210.

Figure 2B:
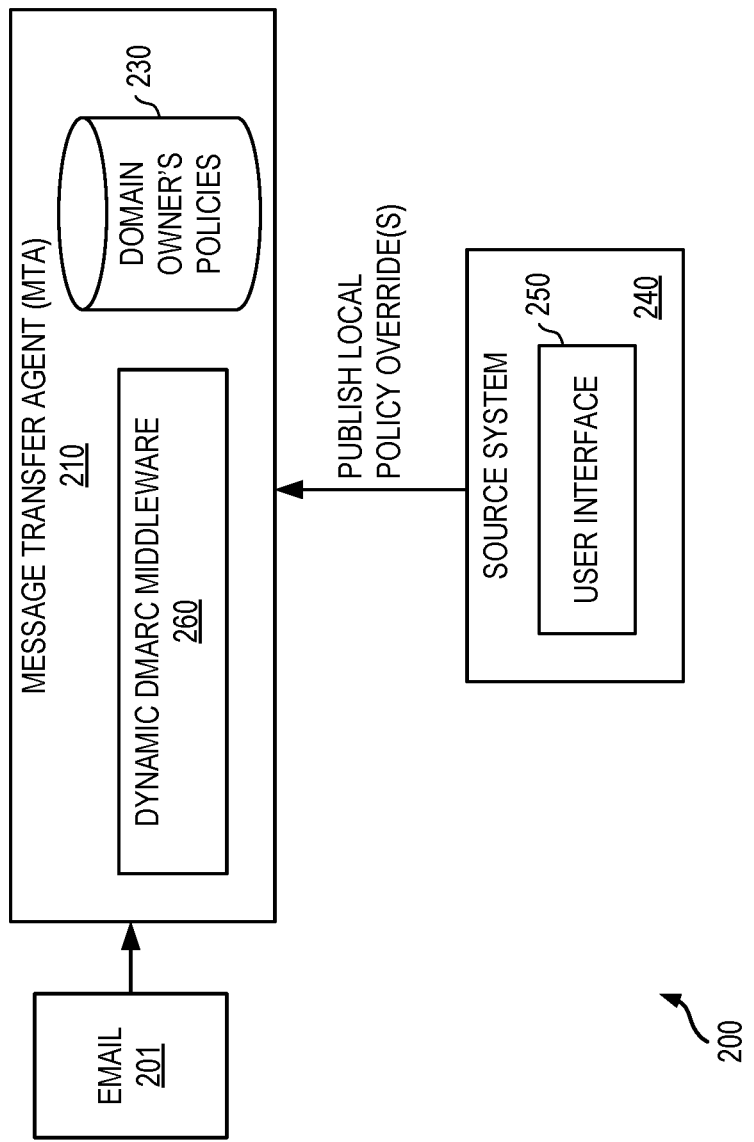

In some embodiments, at least the storage of DMARC local policy overrides can be local to MTA 210. This is illustrated in FIG. 2B. In this case, DMARC local policy overrides are created, modified, and/or managed as before. However, they are published to MTA 210 where dynamic DMARC middleware or module 260 is implemented and stored in policy store 230 local to MTA 210. In FIG. 2B, MTA 210 is adapted for processing email message 201 to obtain the originating email domain from email message 201 and querying dynamic DMARC middleware or module 260 with the originating email domain. In turn, dynamic DMARC middleware or module 260 determines whether any local policy overrides for the originating email domain can be found in policy store 230 and turns the finding(s) to MTA 210 for consumption.

Figure 3:
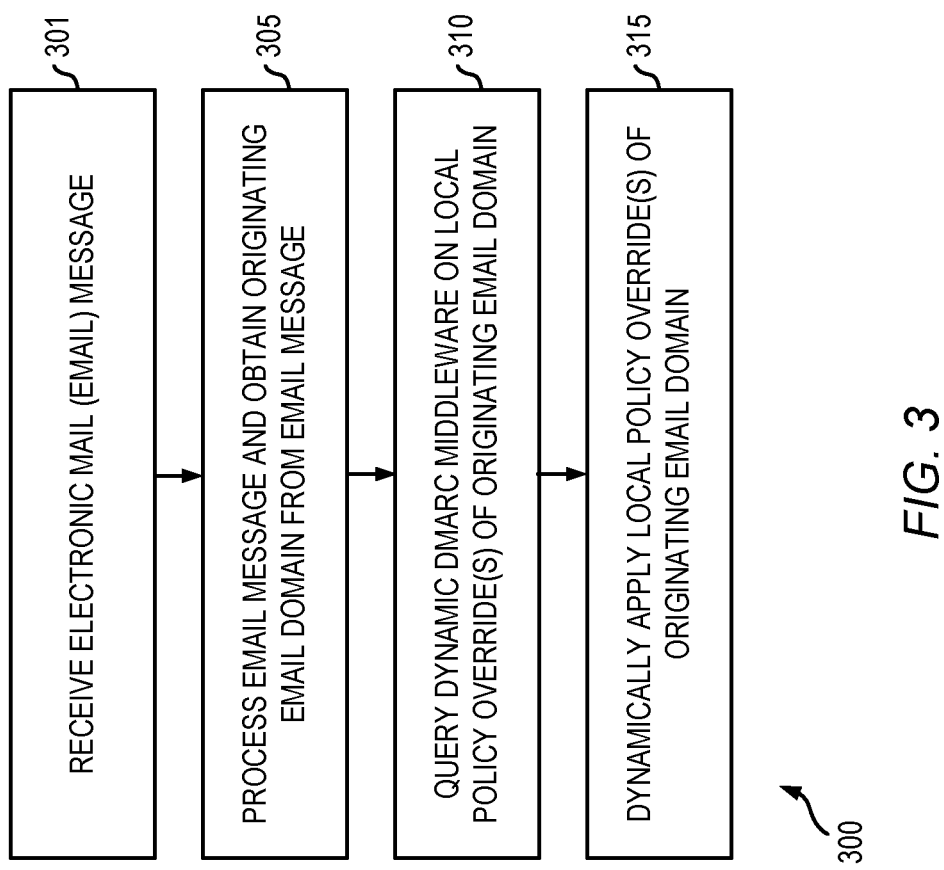
FIG. 3 is a flow diagram illustrating an example of an email message processing method according to some embodiments disclosed herein.

FIG. 3 is a flow diagram illustrating an example of an email message processing method 300 according to some embodiments disclosed herein. In some embodiments, a system implementing dynamic DMARC enforcement method 300 is operable to perform receiving an email message (301). The email message is processed and an originating email domain is obtained (e.g., a sender domain extracted from the mail message header, MFROM field, etc.) using any suitable email processing technique (305). To clarify, in some embodiments, the sender domain (RFC 2821) of the email address is not used as part of DMARC. Rather, the sender domain extracted from the header of the email message according to RFC 2822 (which defines the Internet Message Format of the email message) is used for DMARC lookups. In some embodiments, the Dynamic DMARC process may use the sender domain already used for DMARC lookups to trigger a lookup of dynamic local policy overrides. In some embodiments, method 300 includes querying a dynamic DMARC middleware or module (e.g., preparing and sending a query containing the sender domain to a DNS infrastructure that implements the dynamic DMARC middleware or module) on the originating email domain's DMARC policy, if any (310).

As discussed above, in embodiments where the dynamic DMARC middleware or module is implemented on the DNS infrastructure, "local policy overrides" are published from source system(s) and stored on the DNS infrastructure. In such embodiments, through the dynamic DMARC middleware or module, the DNS infrastructure can determine whether any locally stored "local policy overrides" apply to the originating email domain contained in a query (e.g., from the MTA) and return a response (e.g., any local policy overrides that applies to the originating email domain). Accordingly, method 300 can further include dynamically enforcing/applying any applicable DMARC policy override(s) (315). For instance, a DMARC-compliant MTA can deliver an email message even if the email message fails DMARC because a local policy override applicable to the originating email domain indicates that the email message should be delivered.

Embodiments disclosed herein can provide many advantages. For example, the dynamic DMARC solution disclosed herein can improve the defense from domain spoofing attacks and increase the efficacy of DMARC enforcement. Further, since management of local policy overrides is done outside of a MTA, the dynamic DMARC enforcement solution disclosure herein can improve the performance of the MTA, allowing the MTA to easily scale to accommodate network traffic.

Figure 4:
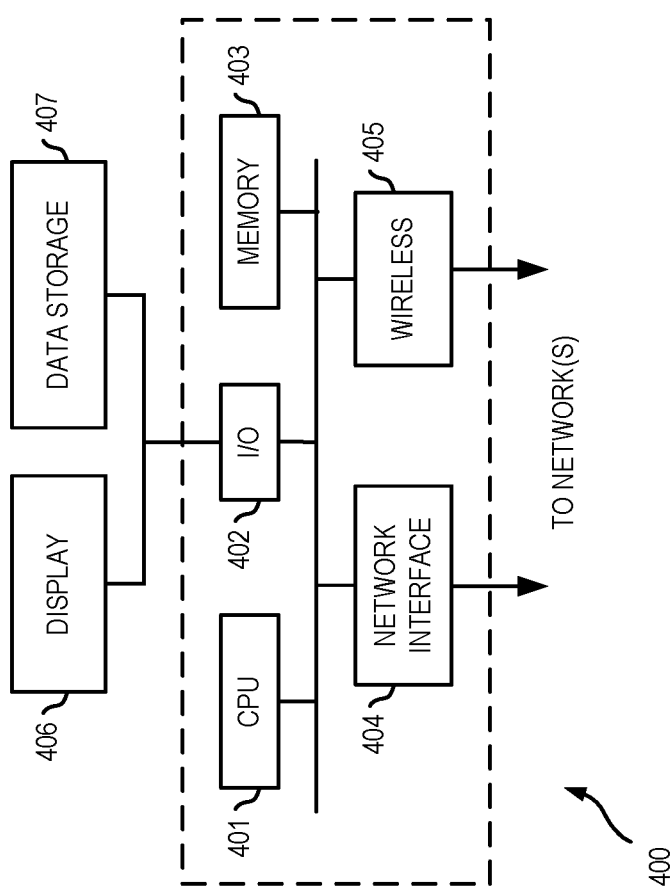
FIG. 4 depicts a diagrammatic representation of a data processing system for dynamic DMARC enforcement according to some embodiments disclosed herein.

FIG. 4 depicts a diagrammatic representation of a data processing system for dynamic DMARC enforcement. As shown in FIG. 4, data processing system 400 may include one or more central processing units (CPU) or processors 401 coupled to one or more user input/output (I/O) devices 402 and memory devices 403. Examples of I/O devices 402 may include, but are not limited to, keyboards, displays, monitors, touch screens, printers, electronic pointing devices such as mice, trackballs, styluses, touch pads, or the like. Examples of memory devices 403 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 400 can be coupled to display 406, information device 407 and various peripheral devices (not shown), such as printers, plotters, speakers, etc. through I/O devices 402. Data processing system 400 may also be coupled to external computers or other devices through network interface 404, wireless transceiver 405, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for dynamic Domain-based Message Authentication, Reporting, and conformance (DMARC) enforcement, comprising:
   determining, by a computer, an originating domain of an electronic message;
   applying, by the computer, a DMARC check on the electronic message;
   responsive to the electronic message failing the DMARC check, querying, by the computer, a dynamic DMARC module about the originating domain's DMARC policy and what trusted source is authorized to send electronic messages on behalf of the originating domain, wherein the dynamic DMARC module is operable to determine whether any local policy overrides apply to the originating domain's DMARC policy and wherein the dynamic DMARC module returns a local policy override; and
   based on the local policy override from the dynamic DMARC module, dynamically taking, by the computer, an appropriate action on the electronic message regardless of the originating domain's DMARC policy, the appropriate action including delivering, modifying, or quarantining the electronic message even if the electronic message failed the DMARC check.

2. The method according to claim 1, wherein the local policy overrides are stored in a policy store local to a domain name system infrastructure or a mail transfer agent where the dynamic DMARC module is implemented.

3. The method according to claim 1, wherein the local policy override is published from a source system to a domain name system infrastructure or a mail transfer agent where the dynamic DMARC module is implemented.

4. The method according to claim 1, wherein determining the originating domain of the electronic message comprises parsing the electronic message and extracting a sender domain from a header or data field of the electronic message.

5. The method according to claim 1, wherein the local policy overrides are created, modified, or managed external to a mail transfer agent where the electronic message is received and processed.

6. The method according to claim 1, wherein the DMARC check comprises a Sender Policy Framework check or a Domain Keys Identified Mail check.

7. The method according to claim 1, further comprising:
   applying the originating domain's DMARC policy to the electronic message, wherein the originating domain's DMARC policy comprises the DMARC check.

8. A system for dynamic Domain-based Message Authentication, Reporting, and Conformance (DMARC) enforcement, the system comprising:
   a processor;
   a non-transitory computer-readable medium; and
   instructions stored on the non-transitory computer-readable medium and translatable by the processor for:
      determining an originating domain of an electronic message;
      applying a DMARC check on the electronic message;
      responsive to the electronic message failing the DMARC check, querying a dynamic DMARC module about the originating domain's DMARC policy and what trusted source is authorized to send electronic messages on behalf of the originating domain, wherein the dynamic DMARC module is operable to determine whether any local policy overrides apply to the originating domain's DMARC policy and wherein the dynamic DMARC module returns a local policy override; and
      based on the local policy override from the dynamic DMARC module, dynamically taking an appropriate action on the electronic message regardless of the originating domain's DMARC policy, the appropriate action including delivering, modifying, or quarantining the electronic message even if the electronic message failed the DMARC check.

9. The system of claim 8, wherein the local policy overrides are stored in a policy store local to a domain name system infrastructure or a mail transfer agent where the dynamic DMARC module is implemented.

10. The system of claim 8, wherein the local policy override is published from a source system to a domain name system infrastructure or a mail transfer agent where the dynamic DMARC module is implemented.

11. The system of claim 8, wherein determining the originating domain of the electronic message comprises parsing the electronic message and extracting a sender domain from a header or data field of the electronic message.

12. The system of claim 8, wherein the local policy overrides are created, modified, or managed external to a mail transfer agent where the electronic message is received and processed.

13. The system of claim 8, wherein the DMARC check comprises a Sender Policy Framework check or a Domain Keys Identified Mail check.

14. The system of claim 8, wherein the instructions are further translatable by the processor for:
applying the originating domain's DMARC policy to the electronic message, wherein the originating domain's DMARC policy comprises the DMARC check.

15. A computer program product for dynamic Domain-based Message Authentication, Reporting, and Conformance (DMARC) enforcement, the computer program product comprising a non-transitory computer-readable medium storing instructions translatable by a processor for:
determining an originating domain of an electronic message;
applying a DMARC check on the electronic message;
responsive to the electronic message failing the DMARC check, querying a dynamic DMARC module about the originating domain's DMARC policy and what trusted source is authorized to send electronic messages on behalf of the originating domain, wherein the dynamic DMARC module is operable to determine whether any local policy overrides apply to the originating domain's DMARC policy and wherein the dynamic DMARC module returns a local policy override; and
based on the local policy override from the dynamic DMARC module, dynamically taking an appropriate action on the electronic message regardless of the originating domain's DMARC policy, the appropriate action including delivering, modifying, or quarantining the electronic message even if the electronic message failed the DMARC check.

16. The computer program product of claim 15, wherein the local policy overrides are stored in a policy store local to a domain name system infrastructure or a mail transfer agent where the dynamic DMARC module is implemented.

17. The computer program product of claim 15, wherein the local policy override is published from a source system to a domain name system infrastructure or a mail transfer agent where the dynamic DMARC module is implemented.

18. The computer program product of claim 15, wherein determining the originating domain of the electronic message comprises parsing the electronic message and extracting a sender domain from a header or data field of the electronic message.

19. The computer program product of claim 15, wherein the local policy overrides are created, modified, or managed external to a mail transfer agent where the electronic message is received and processed.

20. The computer program product of claim 15, wherein the DMARC check comprises a Sender Policy Framework check or a Domain Keys Identified Mail check.

\* \* \* \* \*